US010012251B2

(12) United States Patent
Tourville et al.

(10) Patent No.: US 10,012,251 B2
(45) Date of Patent: Jul. 3, 2018

(54) MOUNTING BRACKET

(71) Applicants: Michael J. Tourville, Lenoir City, TN (US); William A. Malkes, Knoxville, TN (US); Benjamin D. Nibali, Maryville, TN (US); Kristopher C. Hall, Maryville, TN (US); Jerome W. Tester, Rockford, TN (US)

(72) Inventors: Michael J. Tourville, Lenoir City, TN (US); William A. Malkes, Knoxville, TN (US); Benjamin D. Nibali, Maryville, TN (US); Kristopher C. Hall, Maryville, TN (US); Jerome W. Tester, Rockford, TN (US)

(73) Assignee: Gridsmart Technologies, Inc., Knoxville, TN (US)

( * ) Notice: Subject to any disclaimer, the term of this patent is extended or adjusted under 35 U.S.C. 154(b) by 35 days.

(21) Appl. No.: 15/330,117

(22) Filed: Aug. 9, 2016

(65) Prior Publication Data
US 2018/0045230 A1    Feb. 15, 2018

(51) Int. Cl.
*F16B 2/04*    (2006.01)
*F16B 2/06*    (2006.01)
*F16M 13/02*    (2006.01)

(52) U.S. Cl.
CPC ............. *F16B 2/065* (2013.01); *F16M 13/02* (2013.01)

(58) Field of Classification Search
USPC .......... 248/534, 539, 540, 541, 218.4, 219.2
See application file for complete search history.

(56) References Cited

U.S. PATENT DOCUMENTS

| 2,756,955 | A | * | 7/1956 | Chadowski | H01Q 3/04 248/534 |
|---|---|---|---|---|---|
| 3,508,731 | A | * | 4/1970 | Jablonski | F21V 21/116 248/219.2 |
| 3,721,463 | A | * | 3/1973 | Attwood | F16B 2/04 248/219.2 |
| 3,752,430 | A | * | 8/1973 | Kenyon | F21V 21/116 248/231.21 |
| 3,921,949 | A | * | 11/1975 | Coon | H01B 17/16 174/163 R |
| 4,074,941 | A | * | 2/1978 | Jablonski | F21V 21/116 248/219.2 |
| D252,922 | S | | 9/1979 | Cook et al. | |
| D253,589 | S | | 12/1979 | Horton | |
| 4,337,962 | A | | 7/1982 | Allen et al. | |

(Continued)

*Primary Examiner* — Bradley Duckworth
(74) *Attorney, Agent, or Firm* — Robert J. Lauf

(57) ABSTRACT

A mounting bracket for securing a camera or other device to a hollow pole includes an L-shaped member, attached to the device, with a vertical surface that engages the outer surface of the pole and a horizontal surface that rests on the top surface of the pole while a downwardly-projecting member slides into the top of the pole allowing the device to hang stably on the pole during alignment. A bolt passes axially through the downwardly projecting member and engages a gripping member. The downwardly-projecting member and gripping member have mating surfaces inclined relative to the axis of the bolt, so that when the bolt is tightened, the gripping member slides laterally to engage against the inner surface of the pole. A cover plate engages the outer surface of the opposite side of the pole and is secured to the L-shaped to fully secure the assembly.

4 Claims, 12 Drawing Sheets

(56) References Cited

U.S. PATENT DOCUMENTS

| | | | | |
|---|---|---|---|---|
| 4,456,212 | A * | 6/1984 | Raftery | A47B 13/021 |
| | | | | 108/12 |
| 4,546,944 | A * | 10/1985 | Cea | F21V 21/116 |
| | | | | 248/219.2 |
| 5,411,238 | A * | 5/1995 | Caron | F16M 13/00 |
| | | | | 248/219.2 |
| 5,641,141 | A * | 6/1997 | Goodwin | H01Q 1/12 |
| | | | | 248/218.4 |
| 5,661,946 | A * | 9/1997 | Davis | E04H 12/04 |
| | | | | 248/219.2 |
| 5,975,727 | A * | 11/1999 | Morstein | F21V 21/108 |
| | | | | 248/219.2 |
| 6,047,933 | A * | 4/2000 | Hoover | A47G 29/1216 |
| | | | | 248/145 |
| 6,056,450 | A | 5/2000 | Walling | |
| 6,116,556 | A * | 9/2000 | Roth | E04H 12/24 |
| | | | | 248/200.1 |
| 7,137,605 | B1 * | 11/2006 | Guertler | F16M 13/02 |
| | | | | 248/214 |
| 8,479,679 | B1 * | 7/2013 | Wiese | G09F 17/00 |
| | | | | 116/173 |
| 8,657,522 | B2 | 2/2014 | Broussard | |
| 8,727,298 | B2 * | 5/2014 | Shaffstall | B62J 11/00 |
| | | | | 248/519 |
| 8,794,578 | B2 * | 8/2014 | Lin | H01Q 1/1228 |
| | | | | 248/218.4 |
| 9,140,962 | B2 | 9/2015 | Graham | |
| 9,149,023 | B2 * | 10/2015 | Davis | A01K 31/12 |
| 2008/0107413 | A1 | 5/2008 | Moore et al. | |
| 2014/0138497 | A1 * | 5/2014 | Chung | F16M 11/08 |
| | | | | 248/73 |

* cited by examiner

SECTION A-A

SECTION A-A

MOUNTING BRACKET

BACKGROUND OF THE INVENTION

Field of the Invention

The invention pertains to apparatus and methods for mounting cameras or other devices securely to a hollow pole. More particularly, the invention pertains to a self-supporting mounting bracket that enables one person to safely mount, aim, and secure a device to the top of a hollow pole.

Description of Related Art

There are many situations in which it is desirable to mount a piece of equipment onto a pole at some height above the ground. Particularly in the field of traffic control, where various cameras or other sensors (laser, radar, etc.) are positioned to have an unobstructed view of a roadway or intersection, or signal lights and messaging systems are positioned to be visible to traffic or pedestrians, there is a need for a robust yet user friendly mounting system. Many of the devices being deployed are large or bulky, and yet must be aimed to some degree of accuracy. A mounting fixture that is first secured to the pole and then allows sufficient range of motion to make final adjustments of the device will necessarily be mechanically complex and perhaps prone to go out of alignment over time. Conversely, many mounting approaches require the user to position the device first, and then completely secure the mounting hardware.

One conventional approach for mounting a device onto a pole is typified by the Vaporizer Mounting Bracket for 1¾ inch Diameter Pole (Part No. 210A3314, Hallowell EMC, Pittsfield, Mass.). It consists of a metal plate with two right-angle bends so that a first vertical face can be bolted to a device via bolt holes or slots, and a second vertical face has four holes to accommodate two U-bolts, which pass around the pole and secure the metal plate thereto. The advantage of this arrangement is that the user can slide the assembly to any desired height on the pole and then tighten the U-bolts. However, it will be appreciated that if the mounted device has any significant mass, the operation will very likely require two people, one to support the weight of the device and position it where needed, and a second to tighten the four nuts. This is particularly the case for devices such as cameras and optics that must be pointed accurately in the right orientation to view an intersection, roadway, or other location of interest.

A somewhat similar approach is typified by the Pole Mount Bracket for EasyView Dome Cameras (Nuvico CA-PMB, available from techcctv.com). This bracket consists of a formed metal plate that bolts to the camera, and two adjustable, flexible metal bands that pass around the pole and are tightened to it once the camera has been positioned. This approach has the same shortcoming as the previously described mount, viz., that the device must be supported in its final desired position while tightening the clamps.

An alternative mounting arrangement is typified by the Pole Mount Bracket designed to mount a video camera on a pole (VP-PTCC1, available from Moxa, Inc.). In this product, two die-cast aluminum plates are wider than the pole and are held together by two straight bolts, one on either side of the pole. The two plates each have two shallow V-shaped depressions, allowing the plates to seat stably against the pole with four-point contact when the bolts are tightened. This design has substantially the same advantages and disadvantages as those described above.

What is needed, therefore, is a way to mount a device of any size, shape, and mass onto a pole that will allow its weight to be supported while a single worker precisely aligns the device in a desired direction and then secures the entire assembly in the desired position.

Objects and Advantages

Objects of the present invention include the following: providing a mounting bracket to secure a camera or other device to the top of a hollow pole; providing a mounting method that allows a single person to hang, orient or adjust, and then secure a heavy or bulky object; providing a mounting system that securely grips a hollow pole from both the inside and outside; providing a mounting bracket that engages a hollow utility pole and covers the top surface of the pole to prevent ingress of rainwater; and, providing a mounting bracket that is strong, durable, and manufacturable. These and other objects and advantages of the invention will become apparent from consideration of the following specification, read in conjunction with the drawings.

SUMMARY OF THE INVENTION

According to one aspect of the invention, a bracket for mounting a device to a hollow pole comprises:

a first generally L-shaped structural member, wherein the short leg rests horizontally on the open end of a hollow pole and the long leg extends downwardly along the outer surface of said pole and wherein:

the long leg has an inner surface to engage said pole and an outer surface upon which a device may be mounted;

the short leg has a bearing surface to rest stably upon the top of said pole, and further comprises a downwardly projecting member that extends a selected distance into the interior of said hollow pole, and terminates in a flat surface that is inclined at a selected angle with respect to the axis of said pole; and, a hole running completely through said downwardly-projecting member parallel to the axis of said pole;

an internal gripping member having a hole therethrough and an inclined surface to slidably engage against said downwardly projecting member so that when a bolt is passed through said downwardly-projecting member and said gripping member, and said bolt is tightened, said gripping member slides horizontally and both the downwardly projecting member and the gripping member engage the inner surface of said pole and secure the L-shaped member thereto; and, a cover plate having an inner surface to engage the outer surface of said pole opposite said long leg; and, a means of securing said cover plate to said long leg.

According to another aspect of the invention, a method for mounting a device to a hollow pole comprises the steps of:

a) attaching a device to a first generally L-shaped structural member, said structural member having a short leg to rest horizontally on top of a hollow pole and a long leg to extend downwardly along the outer surface of said pole and wherein:

the long leg has an inner surface to engage said pole and an outer surface upon which said device is mounted;

the short leg has a bottom surface to rest stably upon the top of said pole, and further comprises a downwardly projecting member that extends a selected distance into the interior of said hollow pole, and terminates in a flat surface that is inclined at a selected angle with respect to the axis of said pole; and, a hole running completely through said downwardly-projecting member parallel to the axis of said pole;

b) loosely bolting an internal gripping member to said downwardly projecting member, wherein said gripping member has an inclined surface to slidably engage against said downwardly projecting member so that when said bolt is tightened, said gripping member slides horizontally and both the downwardly projecting member and the gripping member engage the inner surface of said pole and secure the L-shaped member thereto;

c) resting said short leg of said L-shaped member on the top of said pole with the horizontal surface supporting the weight of said device;

d) adjusting the position of said device by rotating the assembly about the axis of said pole;

e) tightening the bolt on said gripping member until said gripping member securely engages the inside surface of said pole; and, f) placing a cover plate against the outer surface of said pole opposite said L-shaped member and securing it thereto.

According to another aspect of the invention, a mounting bracket for mounting a device to a hollow pole comprises:

an attachment surface to which a device to be mounted is secured;

a load-bearing surface to engage the open end of a hollow pole and support the device temporarily;

a first gripping means projecting into said hollow pole and tightenable against the inner surface of said pole; and, a second gripping means tightenable around the exterior surface of the pole, whereby said device is secured to said pole at a plurality of points on both the internal and external surfaces of said pole.

According to another aspect of the invention, a method for mounting a device to a hollow pole comprises the steps of:

a) attaching a device to a bracket having a first load bearing surface that engages the end of a hollow pole and a second surface that engages the outer surface of said hollow pole, said bracket further having a first gripping means that extends from said load bearing surface for a selected distance into said hollow pole and a second gripping means exterior to said pole;

b) placing said bracket so that said load-bearing surface engages the open end of said hollow pole and supports the device temporarily;

c) tightening said first gripping means against the interior surface of said pole; and, d) tightening said second gripping means to secure said second surface of said bracket against the exterior surface of the pole, whereby said device is secured to said pole at a plurality of points on both the internal and external surfaces of said pole.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 2A is a perspective view; FIG. 2B is a front view; FIG. 2C is a cross section viewed along A-A.

FIG. 3A is a front view; FIG. 3B is a cross section along A-A.

FIG. 4A is a cross section taken normal to the pole centerline; FIG. 4B is a cross section taken along the pole centerline FIG. 5A is a left side view; FIG. 5B is a front view; FIG. 5C is a right side view.

DETAILED DESCRIPTION OF THE INVENTION

Figure 1:
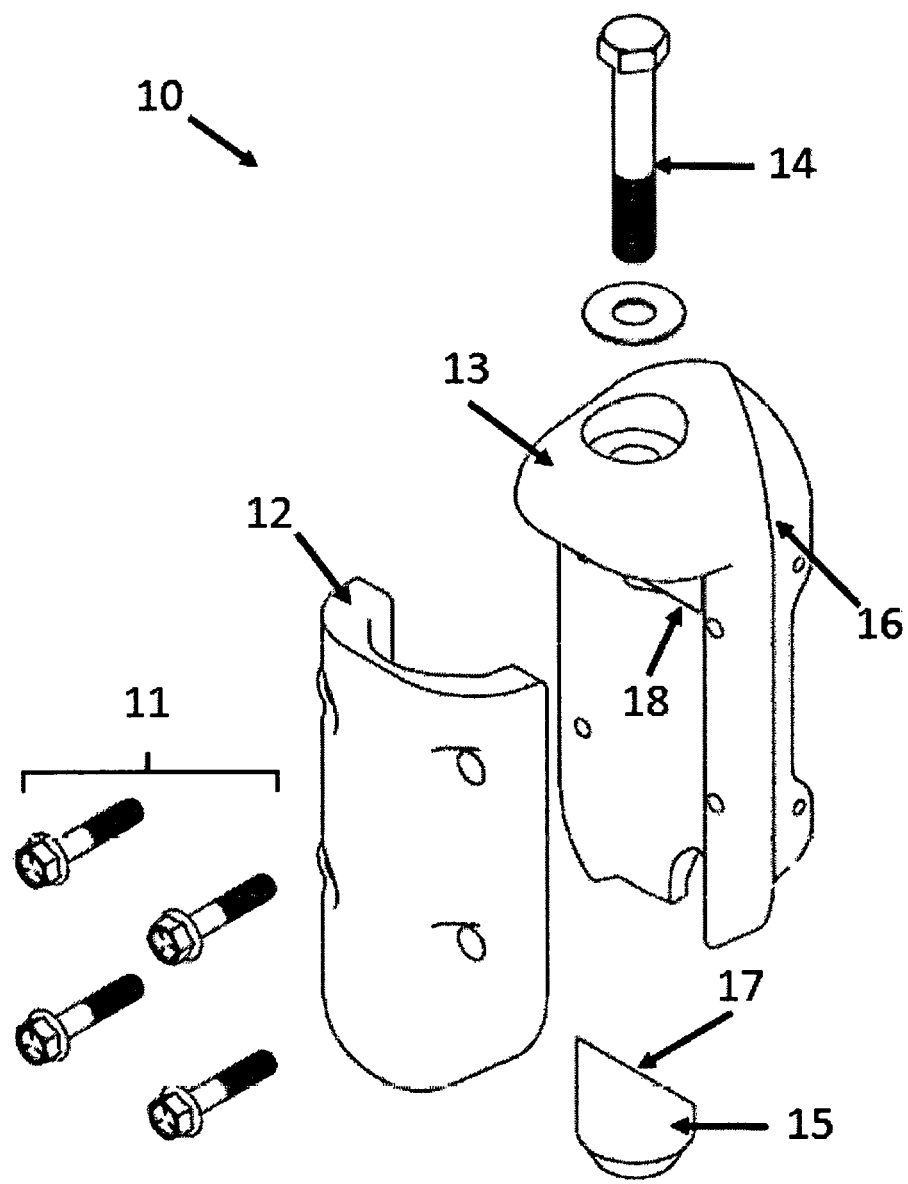
FIG. 1 is an exploded view of one example the present invention.

In its most general sense, the invention comprises a mounting bracket having the following features:
1. An attachment surface to which a device to be mounted is secured;
2. A load-bearing surface to engage the open end of a hollow pole and support the device temporarily;
3. A first gripping means projecting into the hollow pole and tightenable against the inner surface of the pole; and,
4. A second gripping means tightenable around the exterior surface of the pole.

One illustrated example of the invention comprises a mounting bracket that includes several basic components: A first, generally L-shaped member has a short leg with a bearing surface that rests on top of a hollow pole and a long leg that extends downwardly along the outer surface of the pole. The device to be mounted is attached to the outwardly-facing surface of the long leg. Because the short leg has a horizontal surface that rests on the top surface of the pole, it therefore supports the weight of the attached device before any of the securing bolts are tightened, and further allows the device to be rotated about the axis of the pole to any desired direction. Projecting downwardly from this horizontal surface is a generally tubular structure terminating in a surface that is inclined to some angle relative to the axis of the pole. A bolt passes through this tubular member and into a second, smaller "gripping" member, which has a similarly inclined mating surface. When the bolt is tightened, the gripping member slides upwardly along this inclined surface, effectively causing the two members to move outwardly and thereby securely engage opposite sides of the inner surface of the pole. The long leg is then secured to the outer surface of the pole. This combination of internal and external engagement of the pole provides reliable, multi-point contact that stabilizes the device against vibration, wind, or other loads.

The long leg may be secured to the pole by any of several methods. The long leg may extend approximately 180° about the circumference of the pole; a cover plate, which also covers an approximately 180° arc about the circumference of the pole, is then placed against the outside surface of the pole, opposite the long leg. As this cover plate is secured to the long leg, preferably by bolts, the cover plate and the long leg are drawn together, thereby engaging the outer surface of the pole on opposite sides. Alternatively, the long leg may have a generally cylindrical shape, extending more than 180° but slightly less than 360° around the pole to form a generally sleeve-like arrangement. The inner diameter of the sleeve is initially slightly larger than the outer diameter of the pole. Means are then provided to draw the two facing edges together, thereby tightening the sleeve against the pole.

As used herein, for convenience the term "horizontally" defines the direction normal to the axis of the pole; it might be some angle relative to true horizontal if the pole is erected at some angle relative to true vertical. Similarly, the term "downwardly" defines a direction substantially parallel to the axis of the pole and away from the open end or top of the pole. The terms outer, outward, outwardly-facing, etc. refer to generally vertical surfaces that will face away from the pole after installation; the terms inner, inward, and inwardly-facing refer to generally vertical surfaces that will face toward the pole after installation.

Various aspects of the invention will be illustrated in more detail in the following examples, which are illustrative in nature and are not intended to limit the scope of the invention.

EXAMPLE

FIG. 1 presents an exploded view 10 of one example of the invention, to illustrate the relationship of the various components. The components are oriented as they would be for the typical case of a pole that is placed perpendicular to the ground, as is generally the case in applications such as traffic control, street lighting, or other public utilities. It will be understood, however, that the pole might not necessarily be perfectly vertical.

Example

In FIG. 1, four bolts 11 are shown that secure the cover plate 12 to the L-shaped member 13. It will be appreciated that the number and placement of such bolts is not an essential feature of the invention. In some cases, two bolts may be adequate, whereas for larger devices and/or larger poles, more bolts may be desired. It will be further appreciated that in some situations, other means may be used to secure the cover to the L-shaped plate. For example, the cover plate may be attached to the L-shaped plate using a hinge and latch mechanism. In this case, the assembly would be hung on the pole and aligned, the center bolt 14 tightened to snug the internal gripping member 15 into place, and then the cover plate would be swung shut and latched into place against the outer surface of the pole.

Example

Figure 4A:
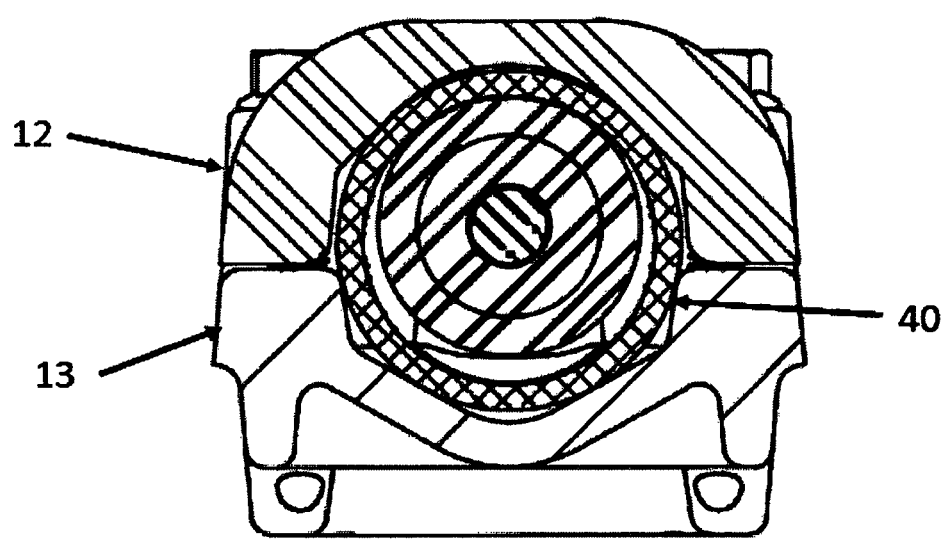
FIGS. 4A-B present a schematic diagram, in cross section, illustrating how the L-shaped member, the gripping member, and the cover plate work together to secure a mounting bracket to the interior surface, the exterior surface, and the top of a hollow pole in accordance with one example of the invention.
Figure 4B:
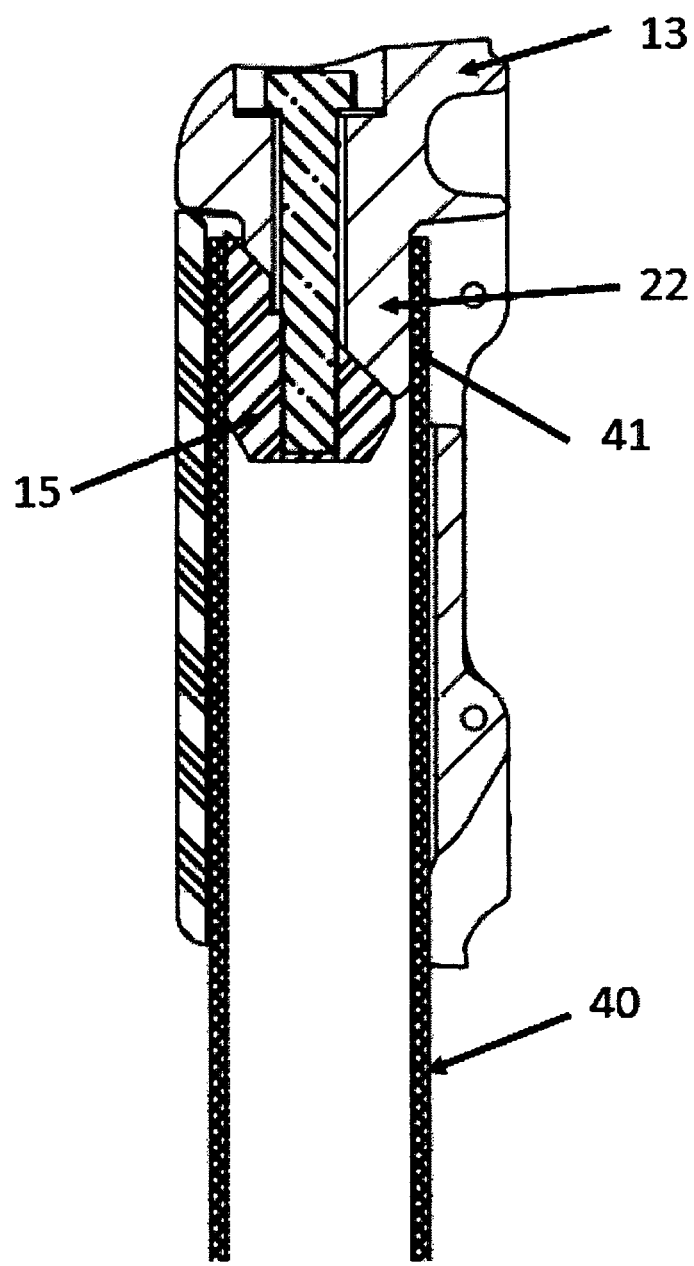

As shown more clearly in FIG. 4B, although this is not essential, the short leg of the L-shaped member 13 preferably covers the entire periphery of the top of the hollow pole 40. Not only does this provide the maximum support during alignment, but it has the further benefit of preventing the ingress of rain, snow, etc. into the interior of the pole, which helps to mitigate the deleterious effects of corrosion, freezing/thawing, or other environmental factors.

Example

Figure 2A:
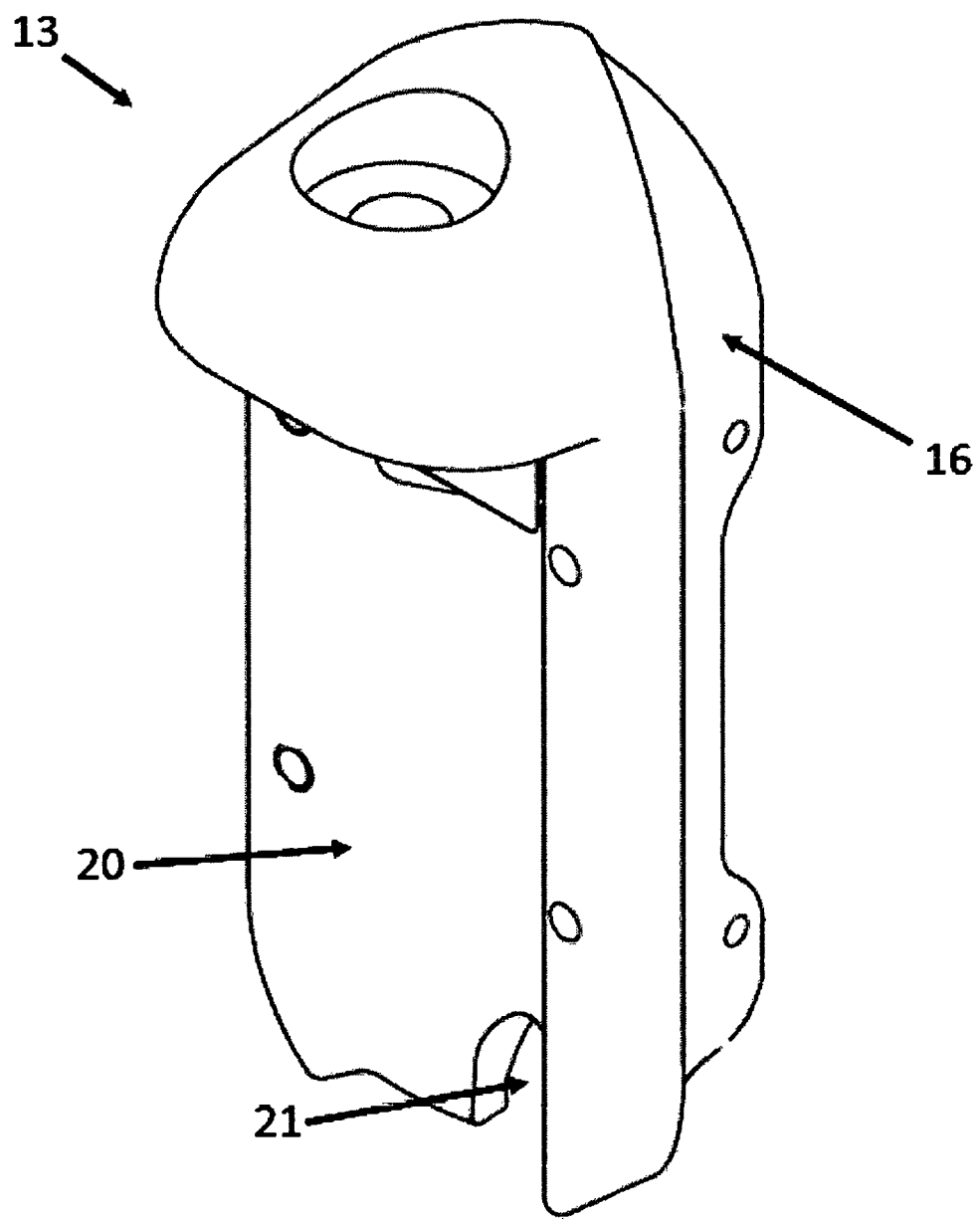
FIGS. 2A-C present a schematic diagram of a generally L-shaped member in accordance with one example of the invention.
Figure 2B:
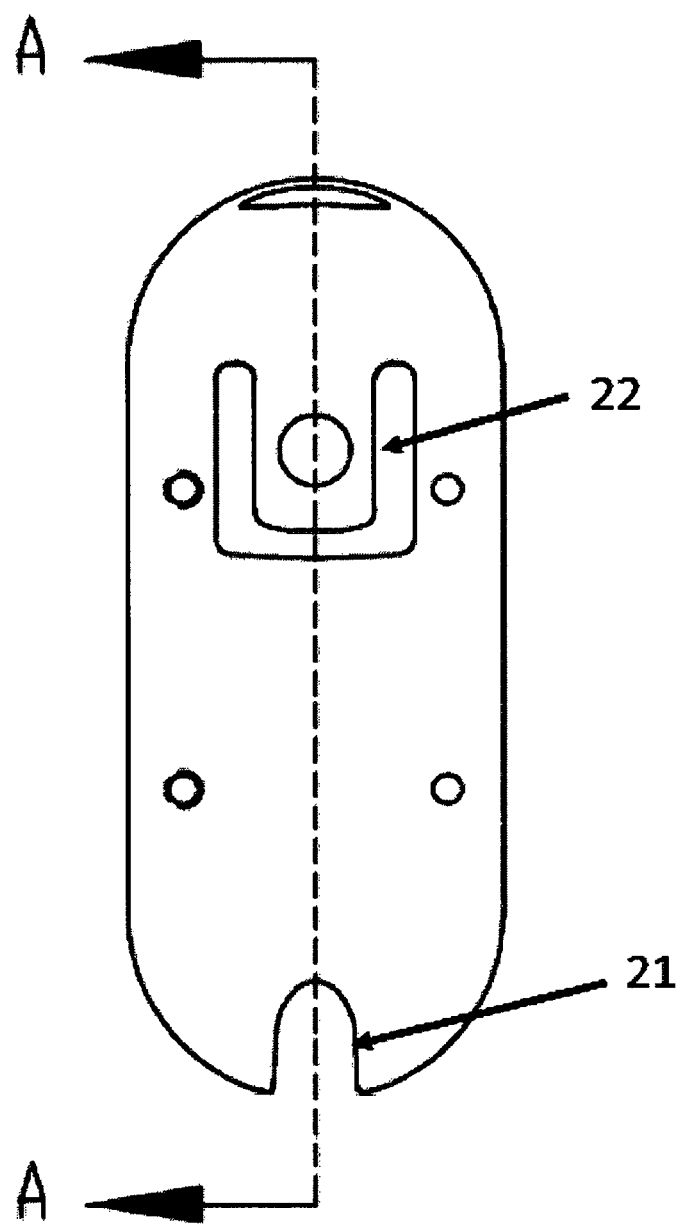
Figure 2C:
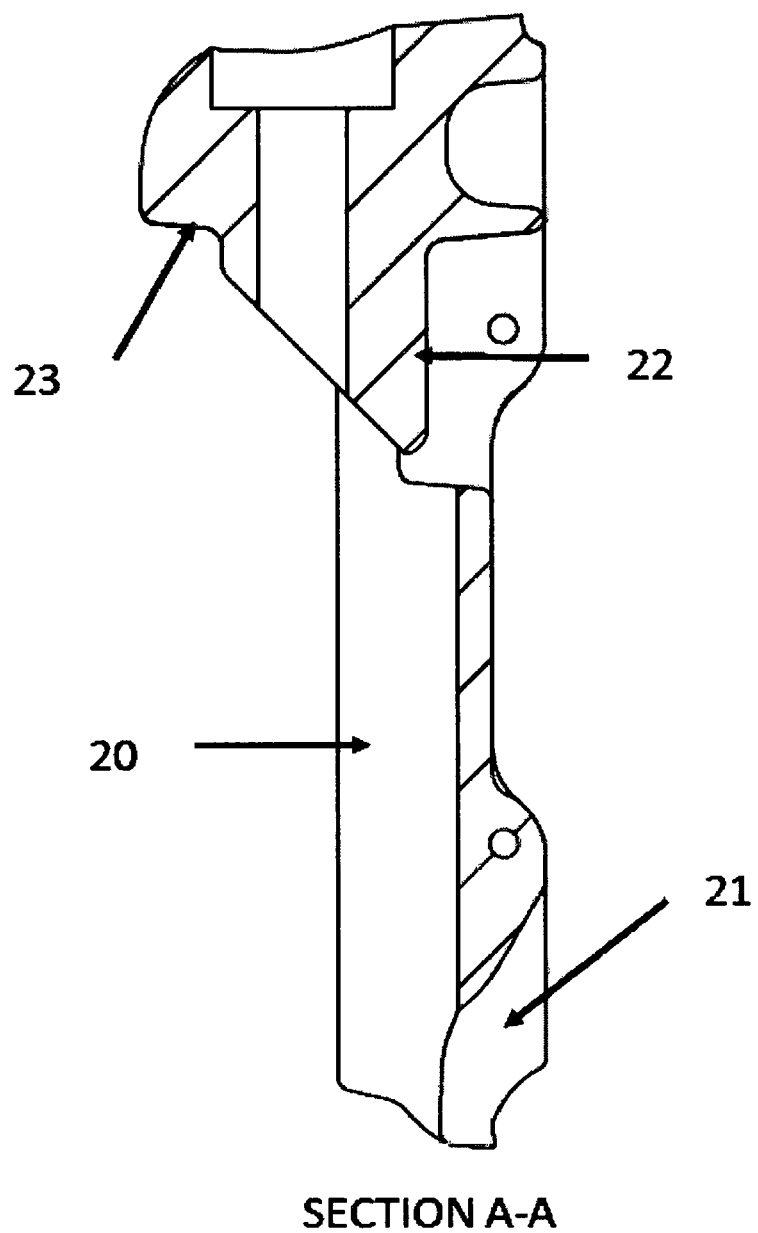

As shown in FIG. 2, the L-shaped member preferably has a curved surface 20 that generally conforms to a supporting pole of a standard size. It will be appreciated that other configurations of this member may be contemplated. For example, in lieu of a curved surface, the long leg of the L-shaped member may simply contain projections or "feet" that engage the pole at various places rather than over a substantially continuous area. This might be useful, e.g., if there is a need to accommodate some variability in the diameter or roundness of the poles the user must work with. Conformability to irregularities in the pole will be further enhanced by the inherent flexibility that will exist in the structural components, depending on what materials are used, as will be further described below.

Applicants contemplate that in many or most cases, the device to be mounted will have power and signal cable(s) that will, in general, run down the outside of the pole. The L-shaped member 13 preferably includes a small recess 21 through which such cables may be passed. The recess 21 is intended to provide clearance for cables to pass under the long leg in such a way that it will not be pinched between any of the mating surfaces of the various structural components.

Example

Figure 3A:
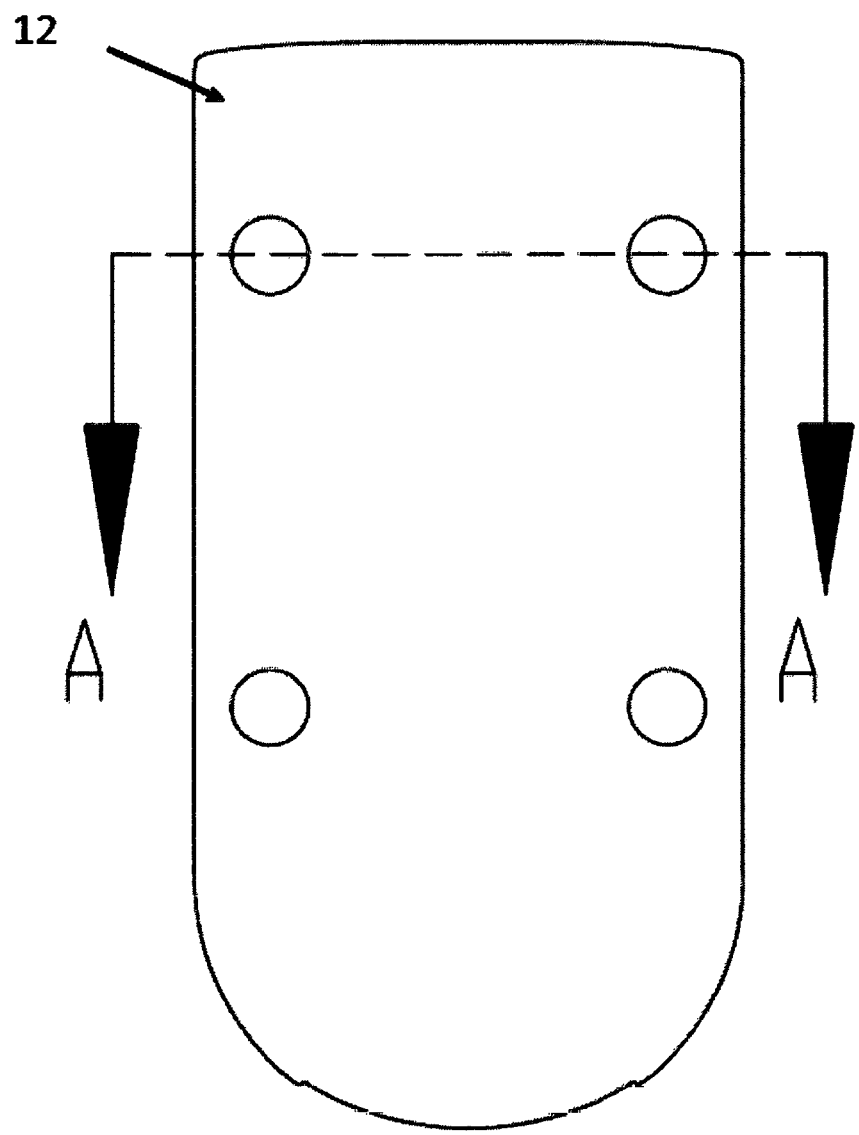
FIGS. 3A-B present a schematic diagram of a cover plate in accordance with one example of the invention.
Figure 3B:
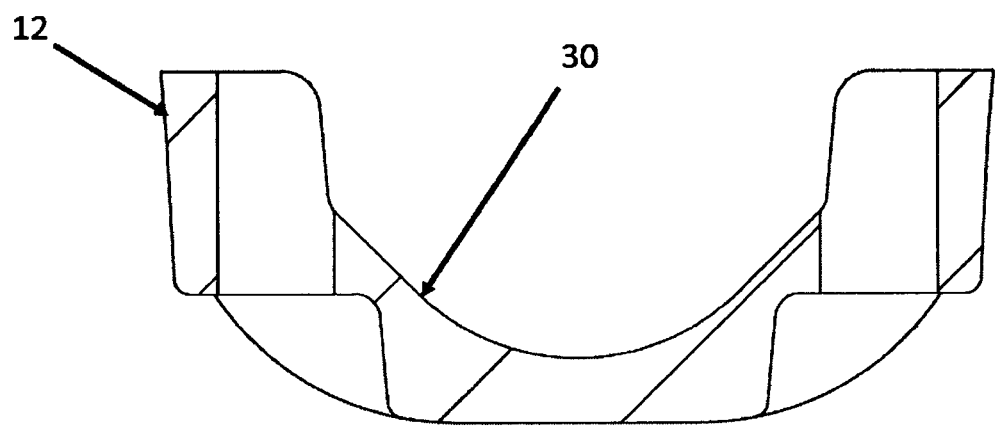

As shown in FIG. 3B, the cover plate 12 also preferably has a curved surface 30 that generally conforms to a supporting pole of a selected size. It will be appreciated that other suitable configurations of this member may be contemplated, as described above for the mating L-shaped member 13.

Example

It will be appreciated that although the downwardly-projecting member 22 is described as "generally tubular", this term does not imply that this member has a cylindrical cross section. Examination of FIG. 4B shows why this is so, viz., the only part of the member that actually contacts the inner surface of the pole 40 is that side 41 opposite the position of the gripping member 15, i.e., the "downward" end of the inclined plane. Thus, the actual cross section of the tubular member 22 will preferably be such a shape that provides sufficient contact area with the pole and sufficient structural rigidity with a minimum amount of material used.

The use of mating inclined surfaces to effect an internal gripping force in a tube is a well-known approach, most familiarly used to secure handlebars in a bicycle frame as shown generally in U.S. Des. Pat. No. 253,598 to Horton, and U.S. Pat. No. 252,922 to Cook et al. It will be appreciated, however, that such mechanisms are generally intended for an assembly that is adjustable over a significant axial range, so that a user can loosen the gripping member, slide the bars to a selected height, and then retighten it to lock the bars into the new position. The invention, by contrast, is intended to eliminate adjustment in the axial direction, and instead relies on firm contact between bearing surface 23 of the short leg and the end of pole 40 in order to securely support the weight of the device while alignment is adjusted to a selected angle about the pole axis. At the same time, it will be further appreciated that the internal gripping mechanism performs an auxiliary function, viz., to further stabilize the device when it is first hung and reliant only upon the top surface of the pole for support. That is, while the device is freely hanging and being rotated into final position, it is securely prevented from accidentally sliding off the pole by the downwardly-projecting member 22 inside of the pole.

It will further be appreciated than many alternative means may be employed to perform the internal gripping function. For example, the downwardly-projecting member may be a split cylinder whose outer diameter is slightly smaller than the inner diameter of the pole. A bolt running axially can draw a generally conical component into the split end, thereby forcing the cylinder walls outwardly to engage against the inner surface of the pole. Alternatively, the axial bolt may pass through a cylinder of elastomeric material such as rubber of an appropriate hardness or durometer value. The initial diameter of the rubber component would be slightly less than the inner diameter of the pole; as the bolt is tightened against a washer at the lower end of the rubber piece, it becomes compressed and the diameter barrels outward to engage the pole. As another alternative, one or more domed washers may be arranged whose outer diameter is less than the inner diameter of the pole while in the domed condition, but when drawn together by the axial bolt the washers flatten and expand outward to contact the pole wall.

The inventive bracket may be constructed from any suitable engineering material, based on the needs of a particular application. In general, the assembly must be sufficiently strong to support the loads, rigid enough to suppress unwanted vibrations, easily manufacturable, and generally durable in the operating environment. The components are preferably inexpensive to manufacture by conventional techniques and straightforward to install with conventional tools.

Example

The components may be any engineering material having suitable properties and may be fabricated by any convenient means. In many cases it will be preferred that the major components will be a cast aluminum alloy, which may be powder coated or anodized. However, the invention is not limited to a particular material; depending on the requirements of a particular application suitable materials may include injection molded polymers, die-cast metals, forgings, extrusions, cold-rolled or hot-rolled ferrous or nonferrous alloys, etc. Metal alloys such as stainless steel, naval brass, etc., may be selected for particular reasons, such as corrosion resistance (particularly in maritime or coastal installations).

Example

Calculations were performed for a commercial camera which includes housing and clamp having overall dimensions of 15.6×8.2 inches as the maximum profile area presented to the wind. For a 90 mph wind at an air temperature of −20° F., the conservative aerodynamic load on said profile was estimated to be 182.5 in-lb of effective torque on the clamp. Tests showed the clamp can withstand greater than 645 in-lb of torque. (The limits of the torque test setup were reached at this value.) Thus, the inventive clamp is sufficiently robust to securely hold the payload under the maximum plausible design loads.

Many installations employ a standard pole or arm, which might typically range from 34 to 78 inches long and 1.5 to 4.33 inches in diameter. The invention can be sized to accommodate virtually any desired pole dimensions.

The inventive mounting system may be used for a wide variety of devices such as those which may have uses in traffic control and other infrastructure and security applications. Such devices include, but are not limited to, air quality sensors; radio equipment; radar devices; security cameras; license plate readers; metering devices; loudspeakers, alarms, and sirens; gunshot detectors; lights and traffic signals; and various devices and sensors commonly referred to as "Internet of Things" (IOT). The invention may equally well be used in similar applications in the railway industry. Naval architects may use the invention to secure various devises to masts, spars, and other structural elements on ships.

In many cases the mounted device may be of significant value and will be mounted in the open for unattended operation for long periods of time. The inventive mounting system may therefore incorporate various security features as are known in the industry, such as tamper resistant bolts and screws with non-conventional geometry that require specialized tools. Some examples include one-way screws, Snake-Eyes® Spanners, Phillips Pin-Heads, Socket Pin-Heads, Opsit™ reverse threads, Torx® Pin-Heads, Tri-Wing®, and TP3®, standard non-tamperproof Torx®, spanner nut/removable security nut, and breakaway nut/non-removable security nut (available from Tamperproof Screw Company, Inc., Hicksville, N.Y.).

Example

Use of the invention is straightforward and in general can be done by a single operator. In a preferred mounting procedure the steps include:
 a. mount the device securely to the outer surface 16 of the long leg of L-shaped member 13, typically using bolts or screws;
 b. loosely bolt gripping member 15 onto downwardly projecting member 22 on the short leg of L-shaped member 13, tightening bolt 14 enough to bring mating inclined surfaces 17, 18 into sufficient proximity to prevent relative rotation from occurring between members 13 and 15;
 c. hang the assembly on top of the hollow pole, allowing the downwardly projecting member 22 and gripping member 15 to slide down inside pole until the assembly comes to rest with the bearing surface 23 of the short leg engaging the top surface of pole 40 and supporting the weight of the mounted device thereon;
 d. rotationally position the assembly so that the mounted device is facing in a desired direction;
 e. tighten bolt 14 to cause gripping member 15 to expand against the inside surface of pole 40 and lock the assembly in the desired position; and,
 f. place cover plate 12 against the pole and secure it to L-shaped member 13, bringing these two components into compression against the outer surface of the pole.

Example

In the case of a camera or other imaging system, it will be appreciated that the installer might power up the device and produce an image on a laptop, tablet, or other mobile device. The operator can then align the camera precisely while verifying the field of view in real time before tightening the gripping member(s) in place.

Example

Figure 5A:
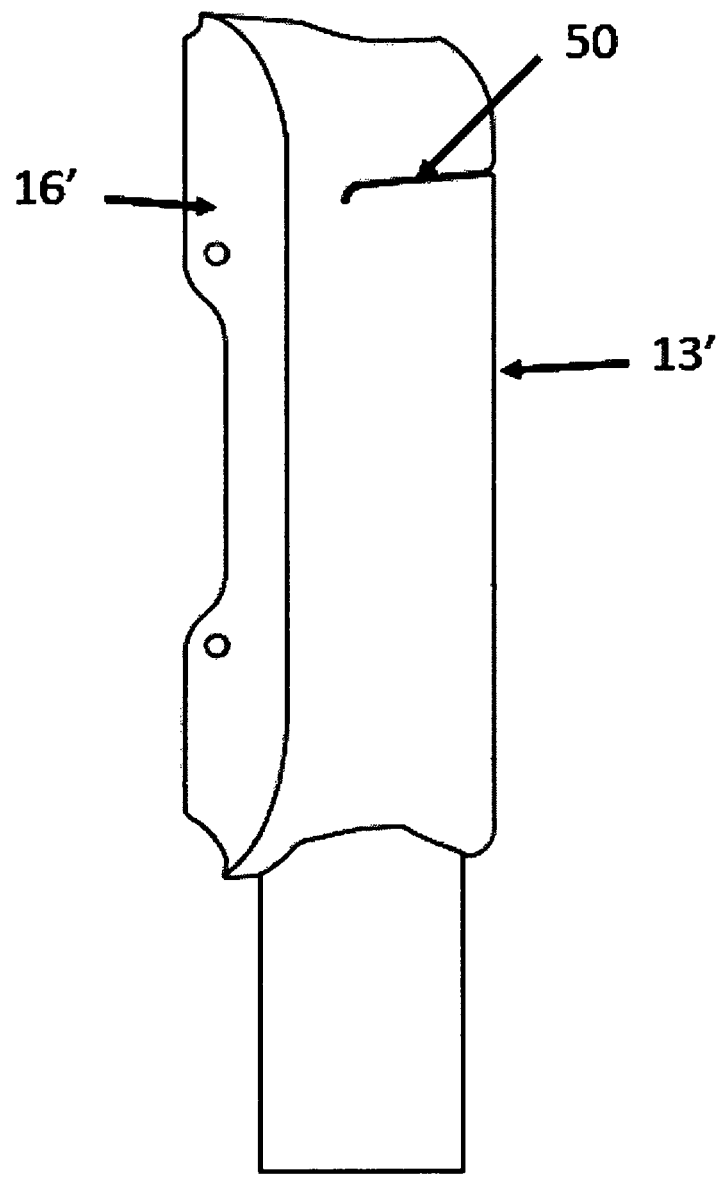
FIGS. 5A-C present a schematic diagram of another example of the invention, in which the long leg of the L-shaped member has a sleeve-like configuration that eliminates the need for a separate cover plate.
Figure 5B:
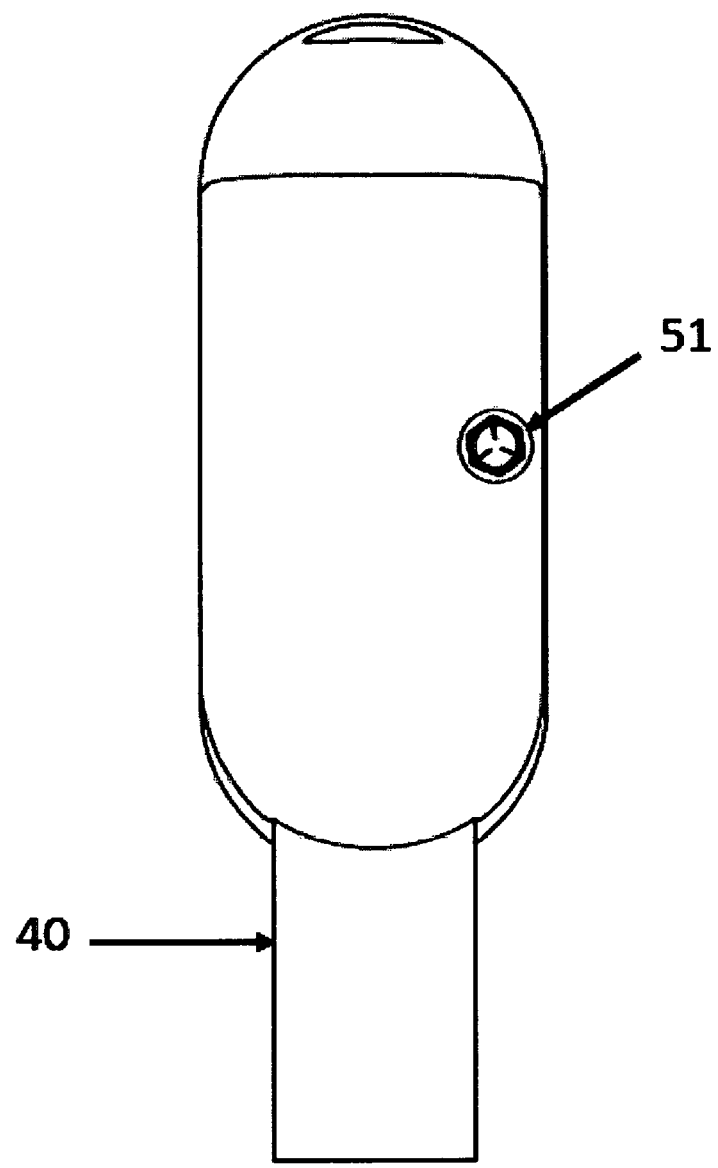
Figure 5C:
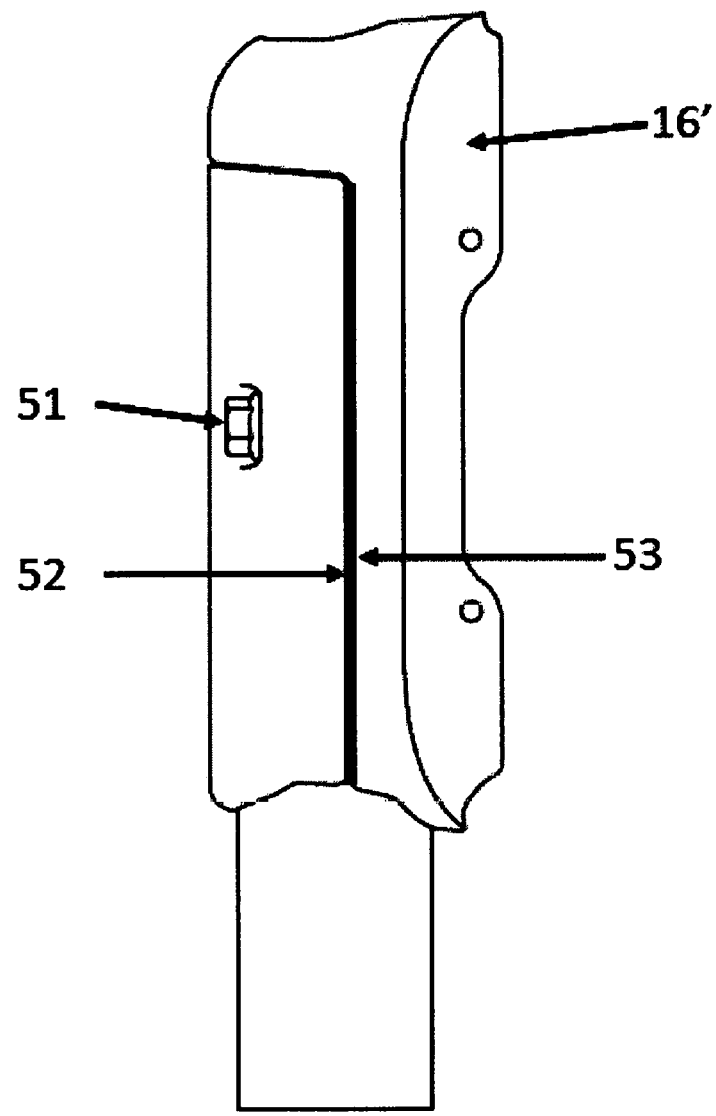

In an alternative configuration shown generally in FIG. 5, the cover plate 12 may be eliminated by forming the long leg of the L-shaped member 13' into a sleeve-like arrangement that extends substantially more than 180° about the circumference of the pole. The total angle subtended by the sleeve is preferably greater than 190°, more preferably greater than 270°, and even more preferably just under 360°. It will be appreciated that the total angle must be less than 360° by an amount sufficient to ensure that there is enough free play to allow the sleeve to be tightened securely against the pole while allowing for variations in pole diameter, roundness, and other imperfections. Some portion of the sleeve will be free to move relative to the rest of the L-shaped member because a cut 50 is provided along part of the circumference. (The internal gripping components 15 and 22 are substantially the same as shown earlier in FIGS. 1 and 2).

In this configuration, in lieu of cover plate 12, means are provided for drawing the two opposite edges 52, 53 of the sleeve 13' together. As shown in FIG. 5, one convenient means is to provide one or more bolts 51 as shown. Alternatively, a ring clamp (not shown) may be placed around the sleeve and may preferably be held in place within a groove provided for that purpose.

Example

Use of the version described in the preceding example is straightforward and in general can be done by a single operator. In a preferred mounting procedure for this configuration the steps include:
a. mount the device securely to the outer surface 16' of the long leg of the L-shaped member 13', typically using bolts or screws;
b. loosely bolt gripping member 15 onto the downwardly projecting member on the short leg of the L-shaped member, tightening bolt 14 enough to bring the mating inclined surfaces 17, 18 into sufficient proximity to prevent relative rotation from occurring between members 15 and 22;
c. hang the assembly on top of hollow pole 40, allowing the downwardly projecting member 22 and gripping member 15 to slide down inside the pole, and the sleeve-like portion of the long leg 13' to slide down around the pole, until the assembly comes to rest with the bearing surface of the short leg engaging the top surface of the pole and supporting the weight of the mounted device thereon;
d. rotationally position the assembly so that the mounted device is facing in a desired direction;
e. tighten bolt 14 to cause the gripping member to expand against the inside surface of the pole and lock the assembly in the desired position; and,
f. draw the two opposite edges of the sleeves toward one another (in this case by tightening bolt 51) to bring the sleeve-like portion of the L-shaped member into compression against the outer surface of the pole.

It will be appreciated that the general operation of the bracket described in the preceding example may also be achieved by intentionally forming the sleeve-like portion 13' so that its inner diameter is slightly smaller than the outer diameter of the pole, thereby creating a compression or interference fit. Means are then provided to temporarily spread the two edges 52, 53 apart enough to slide the assembly onto the pole (e.g., using a screw that passes through one side of the gap and seats against the facing edge so that when the screw advances it will spread the gap further apart rather than drawing it together, or using a tool similar to pliers that are designed to spread lock rings apart during installation).

Example

Use of the version configured to produce an interference fit is likewise straightforward and in general can be done by a single operator. In a preferred mounting procedure for this configuration the steps include:
a. mount the device securely to the outer surface of the long leg of the L-shaped member, typically using bolts or screws;
b. loosely bolt the gripping member onto the downwardly projecting member on the short leg of the L-shaped member, tightening the bolt enough to bring the mating inclined surfaces into sufficient proximity to prevent relative rotation from occurring;
c. temporarily spread the two edges of the sleeve-like portion apart enough to clear the outer diameter of the pole;
d. hang the assembly on top of the hollow pole, allowing the downwardly projecting member and gripping member to slide down inside the pole, and the sleeve-like portion of the long leg to slide down around the pole, until the assembly comes to rest with the bottom surface of the short leg engaging the top surface of the pole and supporting the weight of the mounted device thereon;
e. rotationally position the assembly so that the mounted device is facing in a desired direction;
f. tighten bolt 14 to cause the gripping member 15 to expand against the inside surface of the pole and lock the assembly in the desired position; and,
g. release the spreading means to allow elastic stresses in the body to cause the two opposite edges of the sleeves to move toward one another and bring the sleeve-like portion of the L-shaped member into compression against the outer surface of the pole.

Example

Figure 6:
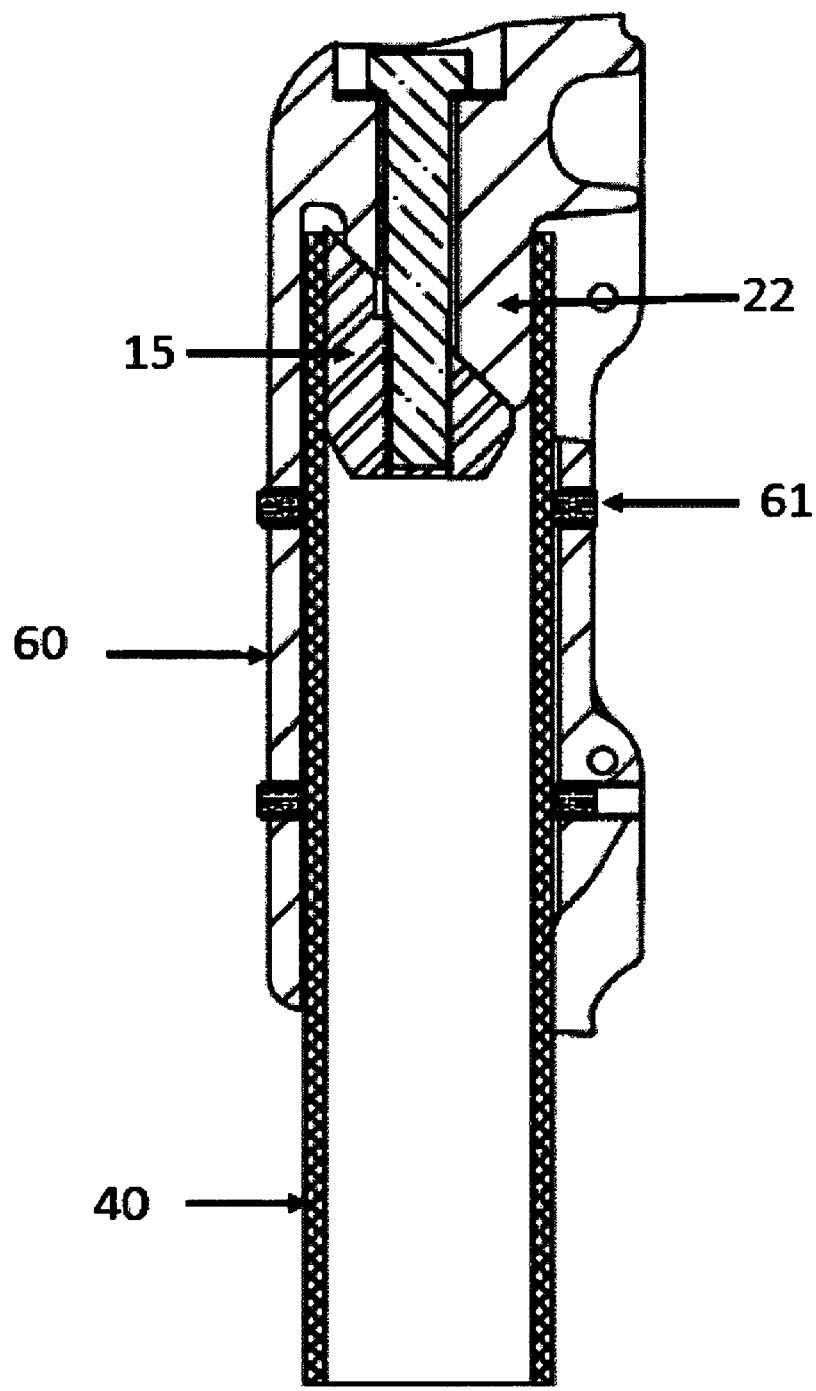
FIG. 6 is a schematic cross section of another example of the invention, in which the bracket forms a substantially continuous sleeve surrounding the pole.

Another variant of the invention is shown in cross section in FIG. 6. In this example, the bracket forms a substantially continuous sleeve 60 whose inside diameter is slightly larger than the outside diameter of the pole 40, allowing a slip fit during initial installation. The internal gripping mechanism 15, 22 is substantially the same as used in the preceding examples. The means for gripping the outer surface of pole 40 is provided in this case by set screws 61, four of which are shown.

The skilled artisan will appreciate that other means may be used to perform the external gripping function. For example, the outer sleeve may be formed from a sheet metal or extruded tube having the top end closed and several longitudinal slots at selected locations around the periphery. The internal gripping mechanism would be mounted internally at the closed end with the bolt on top. The device to be mounted would be secured to the outside of the cylinder, which would then be slipped over the top of the pole. After directional alignment, the top bolt would tighten the internal gripping mechanism, and ring clamps, U-bolts, or other means would then be used to effect the external gripping function by compressing the slotted part of the tube inwardly to engage the pole.

It will be appreciated that the inventive bracket achieves a high degree of structural stability because of the combination of internal and external engagement of the pole at multiple points. For this reason, Applicants prefer that the bracket extends for some distance along the length of the pole so that the external gripping means can engage a sufficient length or area of the pole to resist wind and other loads and to minimize vibrations, particularly when cameras are mounted. The optimal length will depend on such factors and the size and shape of the mounted device, expected wind or snow loads, etc. In general, Applicants prefer that the bracket extends downwardly to a distance of at least one pole diameter. More preferably, it extends at least twice the pole diameter.

We claim:

1. A bracket for mounting a device to a hollow pole comprising:
    a first generally L-shaped structural member, wherein the short leg rests horizontally on the open end of a hollow pole and the long leg extends downwardly along the outer surface of said pole and wherein:
        said long leg has an inner surface to engage said pole and an outer surface upon which a device may be mounted;
        said short leg has a bearing surface to rest stably upon the top of said pole, and further comprises a downwardly projecting member that extends a selected distance into the interior of said hollow pole, and terminates in a flat surface that is inclined at a selected angle with respect to the axis of said pole; and,
        a hole running completely through said downwardly-projecting member parallel to the axis of said pole;
    an internal gripping member having a hole therethrough and an inclined surface to slidably engage against said downwardly projecting member so that when a bolt is passed through said downwardly-projecting member and into said gripping member, and said bolt is tightened, said gripping member slides horizontally and both said downwardly projecting member and said gripping member engage the inner surface of said pole and secure said L-shaped member thereto; and,
    a cover plate having an inner surface to engage the outer surface of said pole opposite said long leg; and,
    a means of securing said cover plate to said long leg.

2. The bracket of claim 1 wherein said cover plate and said long leg compressively engage a portion of the outer surface of said pole when said cover plate is secured.

3. The bracket of claim 1 wherein said long leg extends along the length of said pole by a distance at least equal to the diameter of said pole.

4. A method for mounting a device to a hollow pole comprising the steps of:
    a) attaching a device to a first generally L-shaped structural member, said structural member having a short leg to rest horizontally on top of a hollow pole and a long leg to extend downwardly along the outer surface of said pole and wherein:
        said long leg has an inner surface to engage said pole and an outer surface upon which said device is attached;
        said short leg has a bottom surface to rest stably upon the top of said pole, and further comprises a downwardly projecting member that extends a selected distance into the interior of said hollow pole, and terminates in a flat surface that is inclined at a selected angle with respect to the axis of said pole; and,
        a hole running completely through said downwardly-projecting member parallel to the axis of said pole;
    b) loosely bolting an internal gripping member to said downwardly projecting member, wherein said gripping member has an inclined surface to slidably engage against said downwardly projecting member so that when said bolt is tightened, said gripping member slides horizontally and both the downwardly projecting member and the gripping member engage the inner surface of said pole and secure the L-shaped member thereto;
    c) resting said short leg of said L-shaped member on the top of said pole with the horizontal surface supporting the weight of said device;
    d) adjusting the position of said device by rotating the assembly about the axis of said pole;
    e) tightening the bolt on said gripping member until said gripping member securely engages the inside surface of said pole; and,
    f) placing a cover plate against the outer surface of said pole opposite said L-shaped member and securing it thereto.

* * * * *